US006937408B2

United States Patent
Hattori et al.

(10) Patent No.: US 6,937,408 B2
(45) Date of Patent: Aug. 30, 2005

(54) ROTATION RECORDING APPARATUS AND METHOD OF INSPECTION THEREOF

(75) Inventors: Ryoheita Hattori, Machida (JP); Naoyuki Kagami, Fujisawa (JP); Tetesuya Kokubo, Fujisawa (JP); Nobuya Matsubara, Fujisawa (JP); Kaoru Umemura, Fujisawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 511 days.

(21) Appl. No.: 10/085,804

(22) Filed: Feb. 27, 2002

(65) Prior Publication Data

US 2002/0126404 A1 Sep. 12, 2002

(30) Foreign Application Priority Data

Feb. 27, 2001 (JP) ....................................... 2001-052643

(51) Int. Cl.[7] ............................................. G11B 27/36
(52) U.S. Cl. .............................................................. 360/31
(58) Field of Search .............................. 360/53, 31, 75, 360/78

(56) References Cited

U.S. PATENT DOCUMENTS 5,870,243 A * 2/1999 Ukani et al. ................... 360/75
5,872,677 A   2/1999 Kagami et al. ............. 360/77.05

FOREIGN PATENT DOCUMENTS

JP          9-180388       8/1996    ........... G11B/21/10

* cited by examiner

Primary Examiner—David Hudspeth
Assistant Examiner—Glenda P. Rodriguez
(74) Attorney, Agent, or Firm—Ronald B. Feece; Lewis L. Nunnelley

(57) ABSTRACT

In addition to the conventional test pattern writing in a center of each track and inspection of burst patterns (A and B patterns) through a writing test in a SAT, there is also performed a test pattern data writing test, which is done at each boundary between tracks. With this additional test, it is possible to accurately inspect both C and D burst patterns that are sensitive to a PES signal at each boundary between tracks.

2 Claims, 4 Drawing Sheets

TEST PATTERN WRITING

ROTATION RECORDING APPARATUS AND METHOD OF INSPECTION THEREOF

BACKGROUND OF THE INVENTION

1. Field of the Invention

The present invention relates to an inspecting method employed for inspecting a surface of a magnetic recording medium of a hard disk drive (hereinafter, to be described as the HDD), more particularly to a technique for improving a detection efficiency of defects in a surface analysis test (SAT).

2. Background of the Invention

Various inspections are carried out for each HDD before delivery. Especially, a surface analysis test (SAT) is carried out as a defect test for the servo information written on a surface of each magnetic recording medium. In a usual SAT, a servo information defect is detected according to a decision of whether or not predetermined test pattern data can be normally written in a center of each track, for example, whether or not the data is normally written by the number of predetermined times. Whether or not the head following to the center of each track (controlling the movement of the head to above the center of the target track) is normally done is decided according to a PES (Positioning Error Signal) obtained by reading a burst pattern.

For example, Published Unexamined Patent Application No. 9-180388 and U.S. Pat. No. 5,872,677 specification have disclosed four burst patterns and a technique for generating a PES by reading those burst patterns. That is, both A and B burst patterns are written in the positional information areas at the same width as that of the track symmetrically about the center of the track on the surface of a subject medium. Both of C and D burst patterns are written in the positional information areas at the same width as that of the track symmetrically about the boundary between tracks on the surface of the medium. The burst patterns A and B written symmetrically about the center of each track generate an MPES (Main Positioning Error Signal) while the burst patterns C and D written symmetrically about each boundary between tracks generates a SPES (Slave Positioning Error Signal). Both MPES and SPES function complementarily with each other so as to be used as a signal representing positional deviation between tracks (PES). The PES referred to when in track following is an MPES. When the head moves from one track to another, however, the linear relations between both of the displacement and the MPES output cannot be kept as it is. Instead of the MPES, therefore, the SPES is used, since its sensitivity to the displacement at a boundary is the highest.

In the conventional writing test, a test pattern is written only in a write center of each track (the center of the track) repetitively and it is decided as a normal track (no error) when the test pattern can be written normally by the number of predetermined times.

However, while this method can detect MPES defects accurately around the center of each track, it cannot detect any SPES defects so accurately. This is because only one of C and D patterns exists around the center of each track, thereby the SPES value is not affected so much by the degradation of the burst pattern (C or D pattern) signal and even when the burst pattern could be hardly read. As a result, even when the C or D pattern includes a defect, the defect is not detected and the inspection is often continued as is.

On the other hand, in the case where any disturbance causes noise to be included in a signal related to the C or D burst that is not written actually in a target track, the magnitude relations between C and D are changed easily, thereby track numbers calculated according to MPES, SPES, and CYLID (cylinder number) are disordered. When such a disorder occurs, it often causes a serious error, for example, sudden head movement for compensation and/or execution of write operation in a wrong track.

SUMMARY OF THE INVENTION

It is an object of the present invention to detect defects and errors not only in the center of each track, but also at a boundary between tracks when data is written in a SAT. It is another object of the present invention to detect defects and errors efficiently.

The outline of the invention of the present application will be described as follows. That is, the method for inspecting a rotation recording apparatus of the present invention includes: a rotary recording medium storing positional information recorded thereon and having concentric tracks formed thereon; a head for reading/writing positional information from/on the recording medium; and a device for controlling the relative position of the head with respect to the recording medium. The inspection method includes: a step of controlling the head so as to be moved to an outer periphery portion of the outermost periphery track or at the boundary between a track and an adjacent track; a step of writing test pattern data in the outer periphery portion or the boundary; a step of deciding whether or not the test pattern data is written normally; a step of recording two tracks adjacent to the track at the outermost periphery track or boundary as defective tracks when the decision result is yes; a step of controlling the head so as to be moved to the center of the track; a step of writing the test pattern data in the center; a step of deciding whether or not the test pattern data is written normally; and a step of recording the track as a defective track when the decision result is false.

Concretely, the test described above employs an additional method for enabling a write test to be done at a boundary line between tracks, where the SPES rate of change becomes very large with respect to a micro change of the C/D burst. Consequently, mainly C and D burst defects have come to be detected, thereby serious errors as described above can be avoided effectively. When a test pattern is written at a boundary between tracks at the outer periphery side of each track and an error is detected there while writing of the test pattern data is started at the outer periphery of a disk, tracks at both sides of the boundary are decided as defective. When no error is detected, the test pattern is written in the center of each track. When an error is detected in a track, only the track is decided as defective. The use of such the algorithm will thus make it more efficient to detect defective servo information.

The present invention can also apply to a rotation recording apparatus that enables a test pattern to be written at a boundary between tracks.

DETAILED DESCRIPTION OF THE PREFERRED EMBODIMENTS

Figure 1:
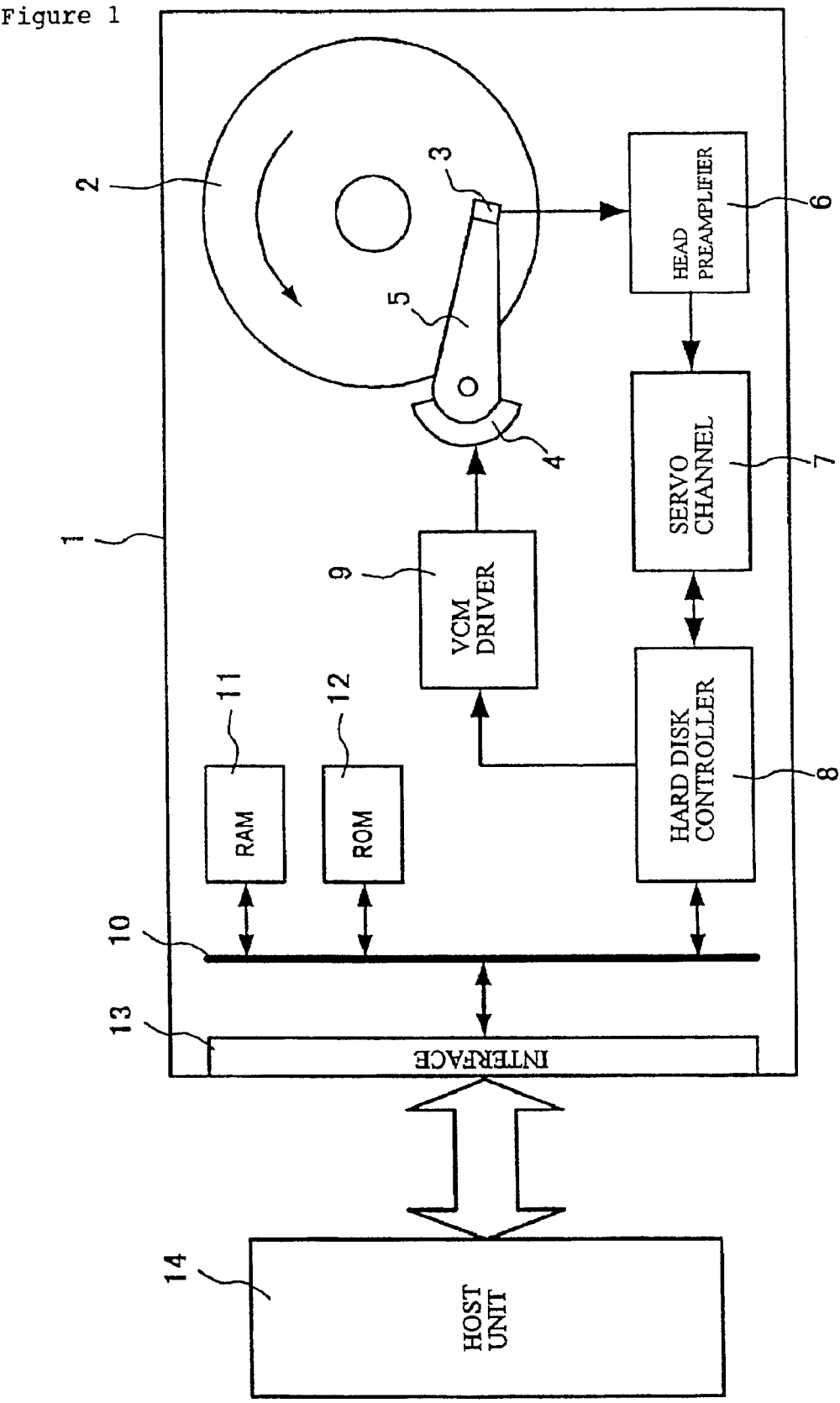
FIG. 1 is a block diagram of a hard disk drive to be inspected in the embodiment of the present invention.

Hereunder, the preferred embodiment of the present invention will be described with reference to the accompanying drawings. It is to be understood, however, that changes and variations may be made without departing from the spirit or scope of the present invention. And, note that the same reference numerals will be given to the same elements throughout the embodiment.

FIG. 1 is a block diagram of a hard disk drive to be inspected with use of the inspection method in this embodiment. A hard disk drive 1 in this embodiment is configured by a magnetic recording medium 2; a head 3; a voice coil motor (VCM) 4; an arm 5; a head preamplifier 6; a servo channel 7; a hard disk controller 8; a VCM driver 9; a bus 10; a RAM (random access memory) 11; a ROM (read only memory) 12; and an interface 13.

The magnetic recording medium 2 is a disk-like recording medium on which information is written magnetically. The recording medium 2 is driven rotationally by, for example, a spindle motor. On the recording medium 2 is written positional information in a radial pattern in a fabrication process.

The head 3 is provided with functions for reading/recording information magnetically from/on the magnetic recording medium 2. The head 3 converts the magnetic information to electric signals with use of, for example, the giant magnetic resistance (GMR) effect.

The VCM 4 drives the arm 5 with use of a current so as to move the head 3 provided at the tip of the arm 5 in the radial direction of the magnetic recording medium 2. The VCM 4 and the arm 5 are combined so as to compose an actuator.

The head preamplifier 6 amplifies the analog signals received from the head 3 and enters the amplified signals to the servo channel 7. Each of the analog signals is amplified at a level through auto gain controlling.

The hard disk controller 8 controls the whole disk drive. For example, the hard disk controller 8 outputs a head control signal to the VCM driver 9 upon receiving a servo signal from the servo channel 7.

The VCM driver 9 receives a head control signal from the hard disk controller 8 and generates a current for driving the VCM 4. Generally, this driving current is limited within the maximum value due to the limited capacity of the power source. The VCM driver 9 in this embodiment is also limited within the maximum current.

The hard disk controller 8 is connected to the RAM 11; the ROM 12; and the interface 13 via the bus 10. The interface 13 interfaces with a host apparatus 14. The ROM 12 stores a program processed in an MPU provided in the hard disk controller 8. The program is loaded into the RAM 11 from the ROM 12. The RAM 11 also functions as a buffer of data to be entered/output to/from the host apparatus 14.

Figure 2:
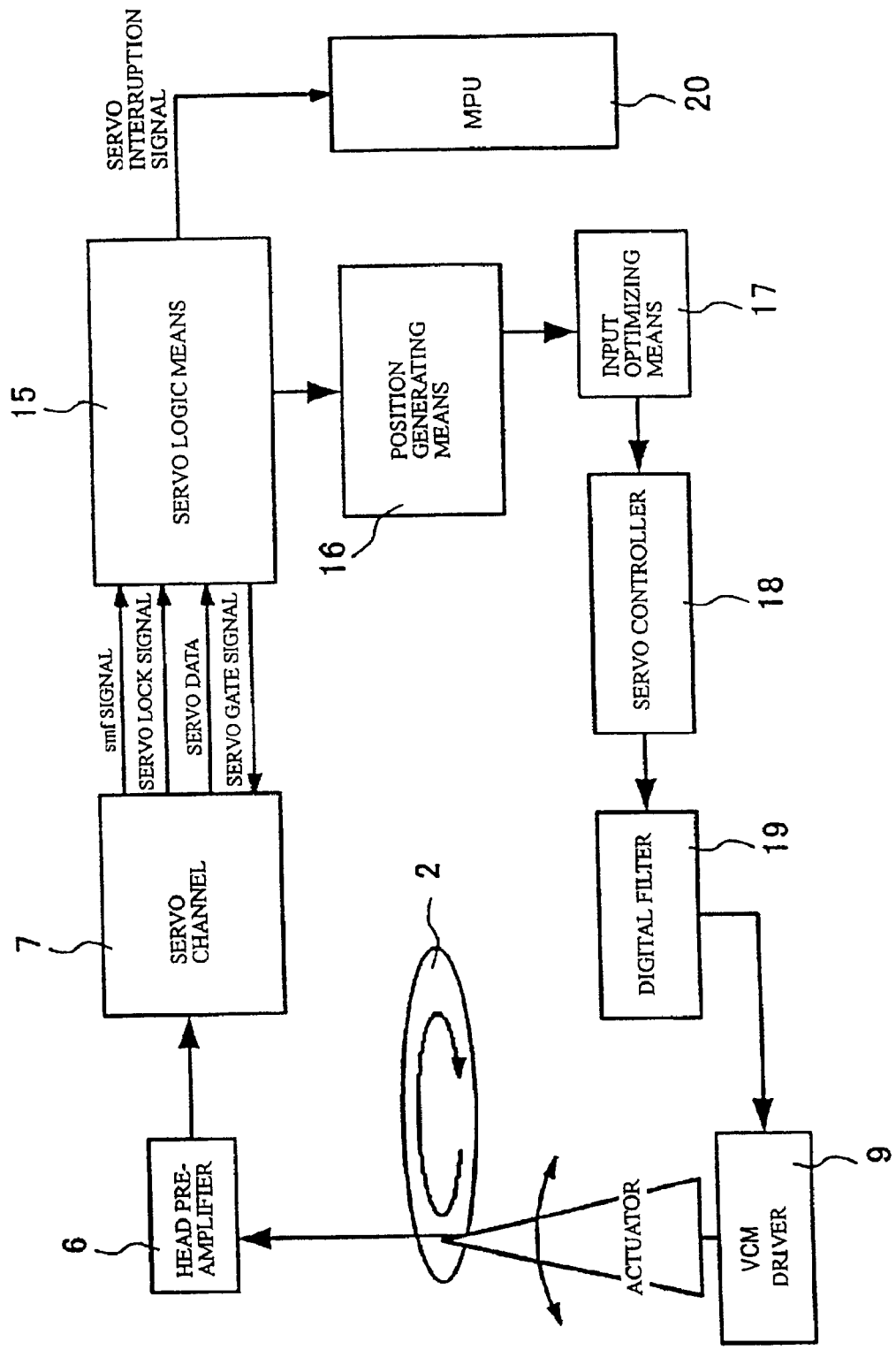
FIG. 2 is a detailed block diagram of a hard disk controller and its peripheral members.

FIG. 2 is a detailed block diagram of the hard disk controller 8 and its peripheral members. In addition to the members or means described above, the hard disk controller 8 also includes the following members or means; servo logic means 15; position generating means 16; input optimizing means 17; a servo controller 18; a digital filter 19; and an MPU 20. Many of those members or means in the hard disk controller 8 are configured by a chip element respectively. They may also be configured as a discrete element.

The magnetic recording medium 2 stores positional information written in a radial pattern as described above. Each positional information item is configured by a servo address mark (SAM), a gray code, and burst patterns. The burst patterns will be described in detail later. The data including such the positional information written on the medium 2 is read by the head 3 and amplified by the head preamplifier 6, then entered to the servo channel 7.

The servo channel 7 detects a SAM from the analog waveform of the head amplifier 6. At the time of detecting a SAM, the servo channel 7 sends an smf (servo address mark found) signal to the servo logic means 15 at the timing of the detection. The servo channel 7 also decodes a gray code following the SAM, then converts each burst signal from analog to digital. Those data items are transferred serially to the servo logic means 15 via a servo data line. The servo channel 7 is activated by a servo gate signal.

The servo logic means 15 controls the timing for activating the servo channel 7 so as to read a servo pattern (positional information) from the recording medium 2 at designed sampling intervals (in control cycles). Obtaining information from the servo channel 7, the servo logic means 15 transfers it to the position generating means 16. The servo logic means 15 also issues a servo interruption to the MPU 20 at the timing at which the positional information is obtained. At the same time, the servo logic means 15 generates servo lock status. The servo logic means 15 may also be provided with a function for monitoring the status of SAM detection in the servo channel 7 and generating a dummy SAM when no SAM is detected in a window for a predetermined time. Consequently, a servo interruption can be issued to the MPU 20 cyclically and surely even when no SAM is detected for any reason.

The position generating means 16 generates the current position from a servo pattern. The servo logic means 15 may also be used to generate this position information. The position generating means calculates position deviation information required for feedback controlling according to the generated current position and a target position.

The input optimizing means 17 is provided with a function for checking the output information of the position generating means 16 so as to disable the servo controller 18 to output data intermittently. The position generating means 16 or servo controller 18 may also be provided with the function of the input optimizing means 17.

The servo controller 18 incorporates feed-back and feed-forward parameters optimized so as to minimize the seek time in itself. The servo controller 18 calculates each sampling (servo interruption control) VCM output.

The digital filter 19 can be provided with a notch filter used to control the resonance of a mechanical system.

The MPU 20 controls various devices according to the microcodes written in the RAM 11 or ROM 12. One of the specially important controlling functions of the MPU 20 in this embodiment is servo controlling executed according to an interruption signal issued from the servo logic.

Figure 3:
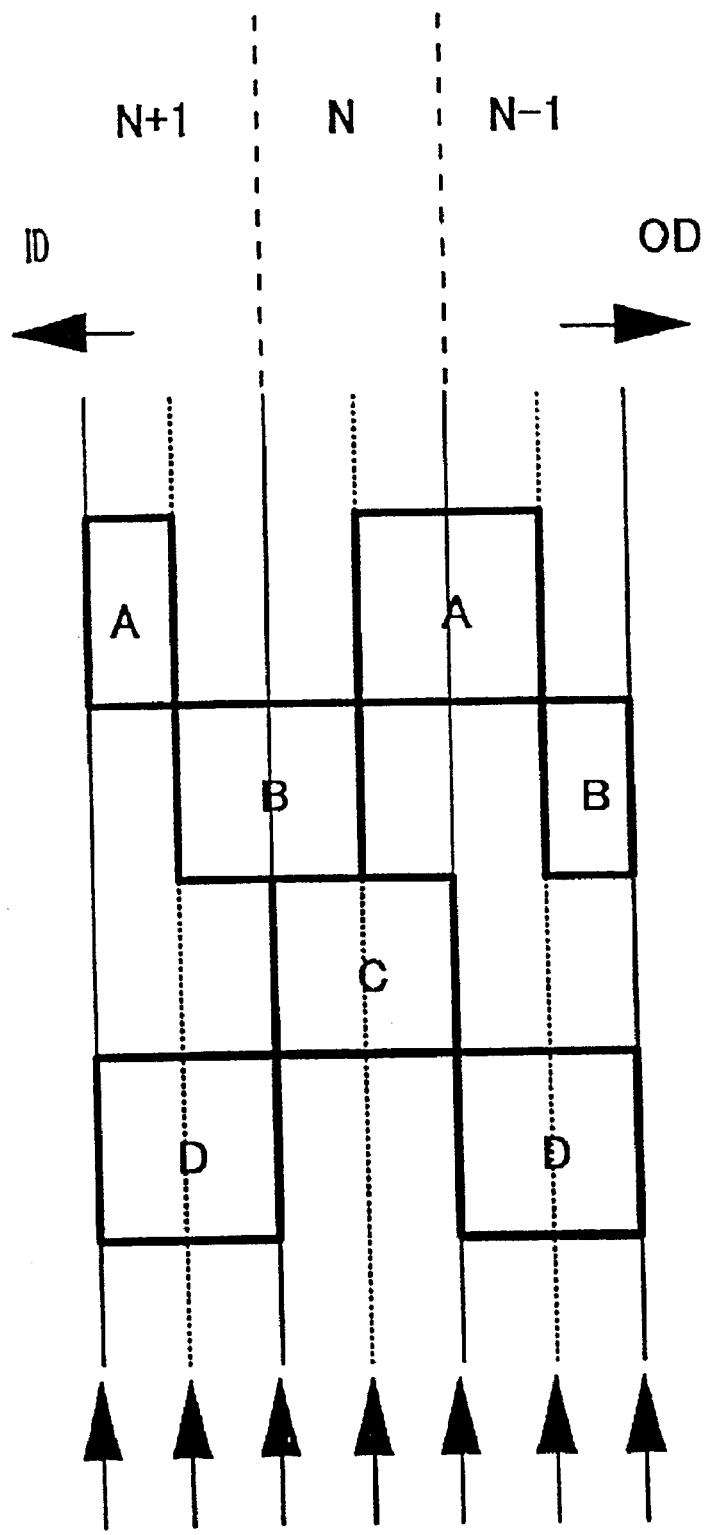
FIG. 3 is an example of burst patterns written on a medium employed in the embodiment of the present invention.

FIG. 3 shows an example of the burst pattern written on the medium 2 employed in this embodiment. In FIG. 3, N+1, N, and N−1 denote tracks, OD denotes a direction of the disk towards the outer periphery, and ID denotes a direction of the disk towards the center of the disk. Concretely, the OD or ID arrow denotes the radial direction of the disk (medium 2). The vertical direction to the radial direction denotes the circumferential direction of the disk.

As shown in FIG. 3, A, B, C, and D burst patterns are written on the medium 2. The A and B patterns are disposed between the center of a track (denoted by a broken line) and the center of an adjacent track at the same width as that of the track. The B pattern is not disposed in the circumferential direction of the area in which the A pattern is disposed. On the contrary, the B pattern is disposed in the circumferential direction of the area in which the A pattern is not disposed. As shown in FIG. 3, therefore, the A pattern and the B pattern are disposed in a zigzag pattern. The C pattern and the D pattern are also disposed in a zigzag pattern while those patterns C and D are not disposed between centers of tracks, but at each boundary between tracks. Concretely, a line being in contact with both A and B patterns becomes the center of a track while a line being in contact with both C and D patterns becomes a boundary between tracks.

While the head follows only the center of each track conventionally, the head also follows each boundary between tracks so as to write a test pattern in this embodiment. A test pattern is written in a data area following a burst pattern.

MPES and SPES are denoted as follows with use of the head signal intensity levels [A], [B], [C], and [D] of the burst pattern A and B or C and D.

$MPES=\{([A]-[B])/([A]+[B])\}*[H]+80\ hex$ $SPES=\{([C]-[D])/([C]+[D])\}*[H]+80\ hex$ Here, [H] denotes a gain to be set freely.

From the above expression, it will be understood that MPES and SPES are substantially the same when the characteristics of their signals are the same even though the signals differ from each other. Actually, the burst patterns A to D are just written in different places on the medium 2; both A and B burst patterns are designed so that each PES value takes the largest change around the center of each track while both C and D burst patterns are designed so that each PES value takes the largest change around each boundary between tracks. Consequently, while both MPES and SPES are substantially the same, the defect detection performance to be added newly to a writing test at each boundary between tracks is assured to be almost the same as the detection performance in writing a test pattern in the center of each track carried out in the conventional test. In FIG. 3, each test pattern writing position in this embodiment is denoted by an arrow in the lower portion.

Figure 4:
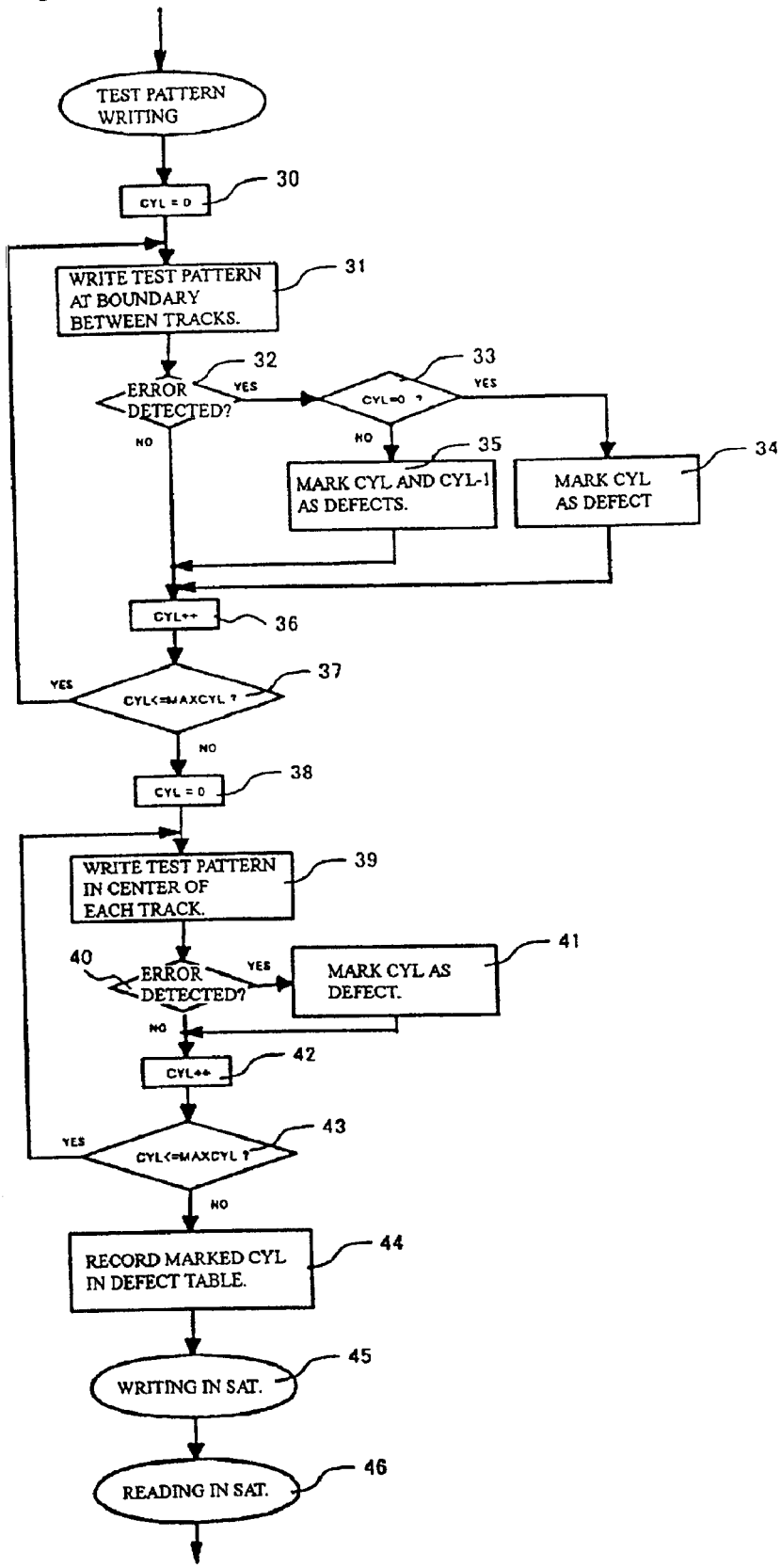
FIG. 4 is a flowchart of an inspection carried out with use of the inspection method, which is an embodiment of the present invention.

FIG. 4 is a flowchart for the inspection method in this embodiment. Writing of test pattern data in this embodiment is done in a process for writing test pattern data in a SAT. Any test (inspection/test) may be done before or after the test shown in this flowchart.

After a given test is performed, a test pattern is written in the data area on the surface of a medium as the first test item. At first, the cylinder number is initialized as "CLY=0" (step 30). The head then seeks the cylinder number 0 and the head position is controlled so as to follow a target track in cylinder 0.

Then, a test pattern is written at a boundary between tracks (step 31). The head is moved to the boundary so that the head position is controlled so as to assume PES=0 when one track is within 0 to 255 PES and the track center is 128 PES. In this state, the test pattern is written in the data area.

After this, it is decided whether or not the test pattern is written normally (step 32). This decision is done by checking whether or not the test pattern is written within the predetermined number of times. When an error is detected in this writing (when the decision result in step 32 is YES), it is decided whether or not the cylinder number is 0 (step 33). When the decision result is YES, the CYL is marked as a defective track (step 34).

When the decision result in step 33 is NO (not 0 cylinder), both CYL and CYL-1 are marked as defective tracks. That is, in the case where a defect is found at a boundary between tracks even when no defect is found in the test performed in the center of each track, it can be a critical error factor as described above. Consequently, the two tracks adjacent to the boundary are registered as defective tracks so as to avoid such the possibility that might cause a serious error beforehand.

Next, when the decision result in step 32 is NO (when no error is detected) or after the processing in step 34 or 35 is ended, the CYL number is increased by one (step 36), then it is decided whether or not the CYL number is under the maximum value (step 37). When the decision result in step 37 is YES (when the CYL is under the maximum value), control goes back to step 31 so as to repeat the above processing. When the decision result is NO (when the CYL is over the maximum value), control goes to step 38.

In step 38, the cylinder number is initialized again as "CYL=0" (step 38). Then, a test pattern is written in the center of a track (step 39). The head is then moved to the center of the track by controlling the head position so that PES=128 is achieved when one track is within 0 to 255 PES. In this state, the test pattern is written in the data area.

Next, it is decided whether or not the test pattern is written normally (step 40). This decision can be done by checking whether or not the writing is done within the predetermined number of times. In the case where an error is detected (when the decision result in step 40 is YES), the CYL is marked as a defective track (step 41).

Next, when it is decided that no error is detected in step 40 or after the processing in step 41 is ended, the CYL number is increased by one (step 42) and it is decided whether or not the CYL value is under the maximum value (step 43). When the decision result in step 43 is YES (when the CYL is under the maximum value), control goes back to step 39 so as to repeat the above processing. When the decision result in step 43 is NO (when the CYL is over the maximum value), control goes to step 44.

In step 44, the marked CYL is registered in a defect table (step 44). This defect table is referred to so as to disable the use of the defective track (defective cylinder) in the real using state thereafter. Consequently, it is prevented to make an unexpected sudden movement of the head and data missing, thereby improving the reliability of the subject disk drive.

After the test pattern is written by such way, a SAT is performed so as to write (step 45)/read (step 46) test pattern data just as conventionally. This completes the surface analysis test (SAT) described above.

According to the inspection method in this embodiment, it is possible to write a test pattern at a boundary between tracks so as to check presence of a defect. Because a boundary between tracks can be tested effectively for C and D burst patterns, a defect/non-defect test can also be performed for C and D burst patterns, thereby the reliability of the subject disk drive is improved.

While the present invention has been described concretely with reference to the preferred embodiment, the present invention is not limited only to the embodiment; changes and variations may be made without departing from the spirit or scope of the present invention.

For example, in the embodiment described above, after a test is done at each boundary between tracks (inspection of burst patterns C and D) once, another test is done in the center of each track (inspection of burst patterns A and B). However, in addition to such the test sequence, the inspection may be started at the outer periphery side of the subject disk, then to a boundary between tracks, the center of a track, and the boundary between tracks sequentially. In such a case, there is no need to write data again in a track in which an error is already detected, the test can thus be done efficiently.

The advantages of the typical one of the inventions disclosed in this specification is as shown below. Concretely, when a test pattern is to be written in a SAT, it is possible to detect defective tracks (cylinders) and other errors not only in the center of each track, but also at each boundary between tracks. Consequently, defects can also be detected accurately from C and D burst patterns that have not been detected conventionally. The reliability of burst information can thus be improved, thereby the reliability of the subject disk drive can be improved. In addition, such defects and errors can be detected efficiently.

What is claimed is:

1. A method of inspecting a rotation recording apparatus having a rotary recording medium storing positional information recorded thereon and having concentric tracks formed thereon, a head used for reading/writing said positional information from/on said recording medium, and a device used for controlling the relative position of said head with respect to said recording medium, the method comprising the steps of:

controlling said head so as to be positioned at a boundary between an outer periphery portion of said track at the outermost periphery or said track and an adjacent track;

recording test pattern data in said outer periphery portion or at said boundary;

a first decision step of deciding whether or not said test pattern data is written normally;

marking two tracks adjacent to said outermost periphery track or said boundary as defective tracks when the decision in said first decision step is yes;

controlling said head so as to be positioned in the center of said track;

recording test pattern data in said center;

a second decision step of deciding whether or not said test pattern data is written normally; and recording said track as a defective track when the decision in said second decision step is yes.

2. The method of inspecting said rotation recording apparatus according to claim 1;

wherein a first pattern is written on the surface of said recording medium, concretely between the center of said track and the center of an adjacent track at the same width as that of said track, said first pattern being used to obtain said positional information;

a second pattern is written on the surface of said recording medium, concretely between the center of said track and the center of an adjacent track at the same width as that of said track in the opposite direction to that of said adjacent track, said second pattern being used to obtain said positional information;

a third pattern is written on the surface of said recording medium fully in the same width as that of said track, said third pattern being used to obtain said positional information;

a fourth pattern is written fully in a track adjacent to said track at the same width as that of said track, said fourth pattern being used to obtain said positional information;

said first and second patterns are read for controlling said head so as to be positioned in the center of said track; and said third and fourth patterns are read for controlling said head so as to be positioned at an outer periphery portion of said outermost periphery track or the boundary with said track.

* * * * *